No. 778,652. PATENTED DEC. 27, 1904.
H. FUNKNER.
CORN CULTIVATOR.
APPLICATION FILED JULY 19, 1904.
2 SHEETS—SHEET 2.
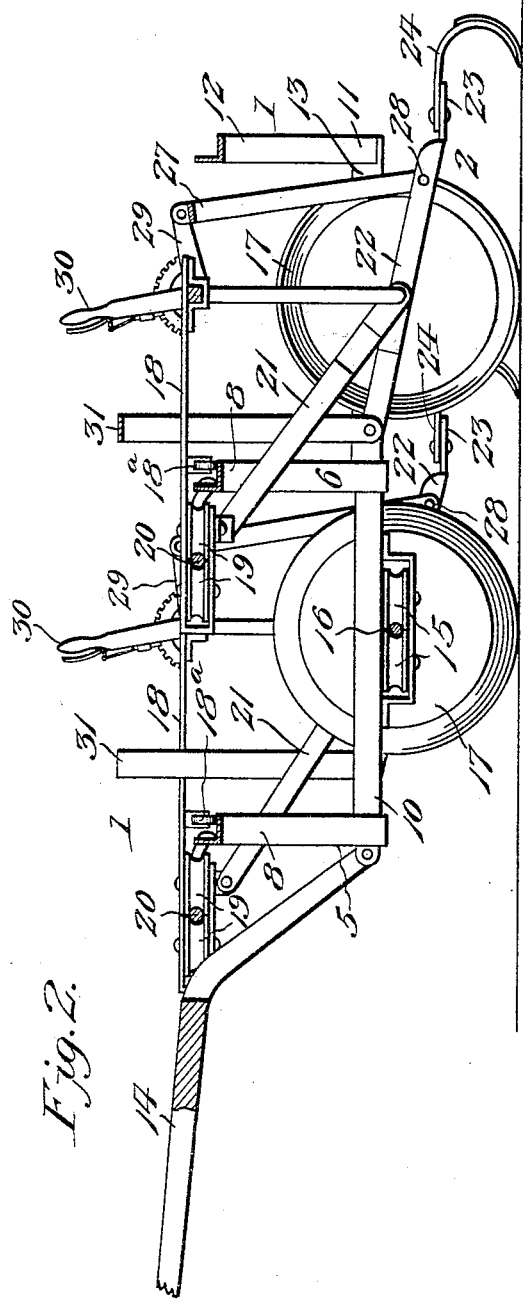
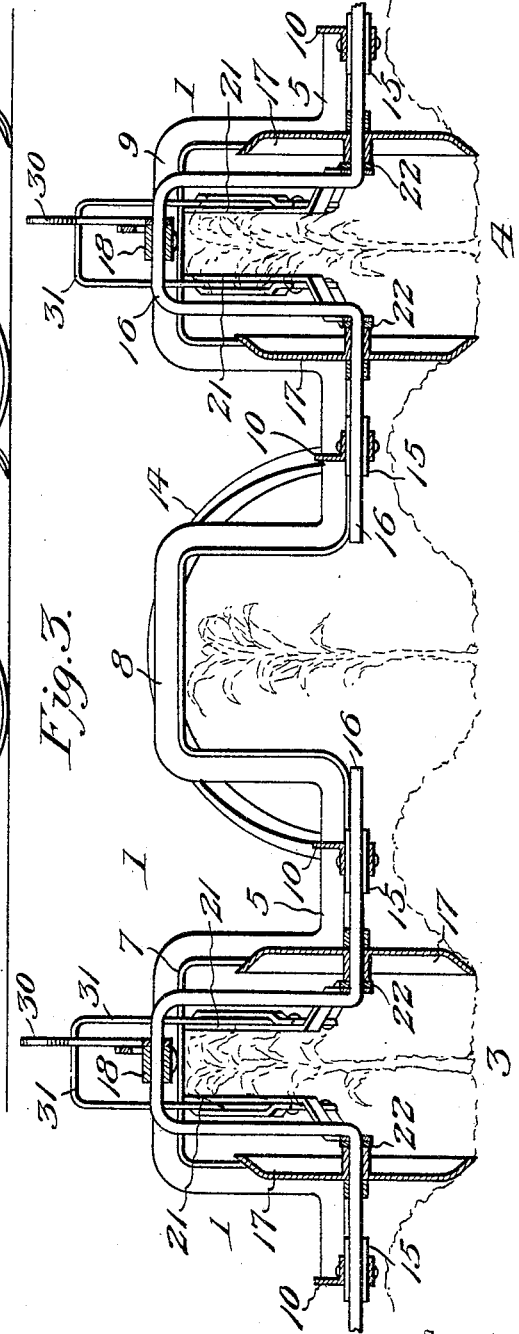
Inventor
Henry Funkner
Witnesses
Edwin G. McKee
J. P. Hollingsworth
By Victor J. Evans
Attorney No. 778,652. Patented December 27, 1904.

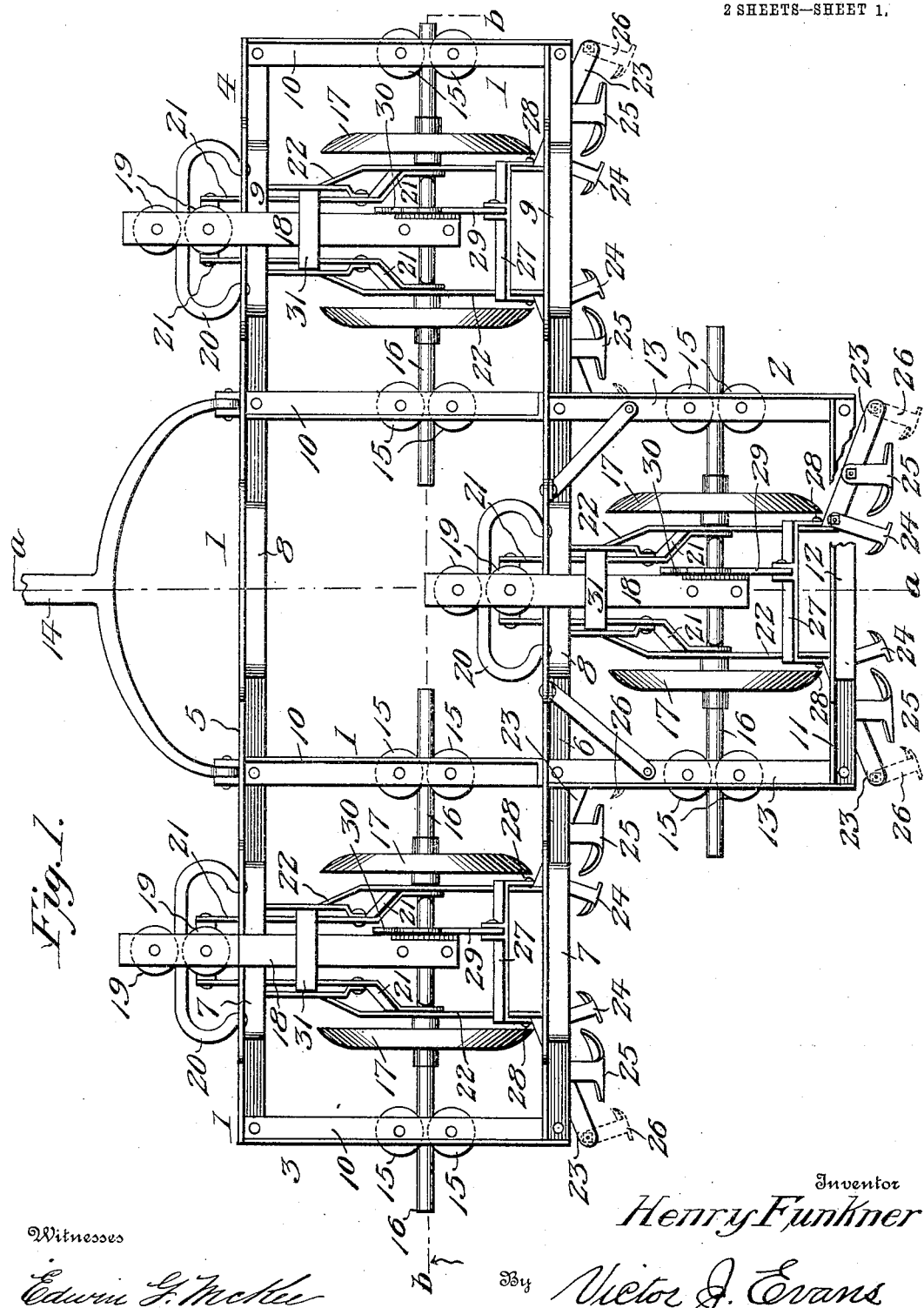

UNITED STATES PATENT OFFICE.

HENRY FUNKNER, OF JANSEN, NEBRASKA.

CORN-CULTIVATOR.

SPECIFICATION forming part of Letters Patent No. 778,652, dated December 27, 1904.

Application filed July 19, 1904. Serial No. 217,209.

*To all whom it may concern:*

Be it known that I, HENRY FUNKNER, a citizen of the United States, residing at Jansen, in the county of Jefferson and State of Nebraska, have invented new and useful Improvements in Corn-Cultivators, of which the following is a specification.

This invention pertains to a three-row corn-cultivating machine especially adapted to cultivate corn planted with a lister-plow. Rows of corn planted by an implement of this kind are not equally spaced, but vary several inches on one side or the other of the correct distance which should separate the rows.

When cultivating corn planted as above described, especially with a three-row cultivator, it is necessary to provide some means for quickly adjusting the cultivating mechanisms that they may accord with the differences in width between the various rows of corn and retain such adjusted position so long as the row is straight, but which will enable each individual cultivating mechanism to follow all irregularities in the row over which it is working. To accomplish the ends sought, a plurality of mechanisms are independently mounted in a rigid frame, each cultivating mechanism being supported on rollers which enable it to move or be moved laterally to the right or left that it may travel at all times centrally over the row of corn under cultivation by said mechanism.

A further advantage gained by the use of this invention resides in the adaptability of the machine or implement to work or cultivate corn from start to finish, no other machine being required to follow it to lay corn by.

In the accompanying drawings, Figure 1 is a plan view of my improved corn-cultivating machine. Fig. 2 is a sectional view on the line *a a* of Fig. 1. Fig. 3 is a similar view on the line *b b* of Fig. 1.

Similar numerals of reference are employed to indicate like parts throughout the several figures.

The cultivator-frame as a whole is indicated by the numeral 1, the central cultivating mechanism by 2, and the lateral cultivating mechanisms by 3 and 4. The lateral mechanisms are in advance of the central one, their supporting-shafts being in line with each other.

The frame 1 is preferably constructed of metal bars of L or other cross-sectional form bent to shape and connected in a manner well known to those skilled in the art. The forward beam 5 and intermediate beam 6 extend the full width of the frame 1 and are arched at 7, 8, and 9 to enable them to pass over the rows of corn. Cross-beams 10 join the beams 5 and 6 to form a stiff frame for supporting the lateral cultivating mechanisms 3 and 4. A rear beam 11, arched at 12, is bolted to the intermediate beam 6 by means of side beams 13 and suitably braced at its connection to the frame 6. The draft-tongue 14, which is placed as high as the arches of the frame-beams that it may not interfere with the growing corn, is divided at its rear end to form two arms, each of which extends downwardly to the frame-bar 5 and is pivoted thereon.

As the cultivating mechanisms 2, 3, and 4 are similar in all respects, a description of one will answer for all.

Journaled in suitable bearings on the frame 1 at opposite sides of one of the cultivating mechanisms are horizontally-disposed grooved rollers 15, there being two rollers on each side in close proximity to each other. Supported in the grooved peripheries of these rollers is an upwardly-arched shaft 16, adapted to move freely in an endwise direction on said rollers. Rotatably mounted on each lower horizontal portion of the arched shaft 16 is a saucer-shaped supporting-wheel 17, the periphery of which is beveled outwardly, as shown, so that the wheels may travel more easily and be guided by the ridges of earth on opposite sides of the furrow in which corn is growing. Bolted to the top or arched portion of the axle 16 is a bar 18, extending over the arched frame-beam in front of said axle, and which carries on its forward end two grooved rollers 19 19, similar to those, 15, on the main frame and disposed in like manner. The rollers 19 19 are arranged to travel on a short horizontal track 20, bolted to the arched frame-beam, as shown. Affixed to the under side of the bar 18 is a small wheel 18$^a$, which runs on the arched part of the frame-beam thereunder to assist in carrying the weight of the bar 18. Brace-rods 21, attached to the lower horizontal portions of the arched shaft 16, extend upwardly and forwardly to the bar 18, to which they are secured. A strong, rigid, and light frame of triangular shape is thus formed to carry the cultivating-shovels, and being mounted on antifriction-rollers it can be moved with ease in a lateral direction under the guidance of the supporting-wheels 17.

A cultivator-beam 22 is pivoted on the axle 16 between each supporting-wheel 17 and brace 21, each of which beams extends rearwardly beyond the periphery of the supporting-wheels 17 and is there provided with an outwardly-extending section 23. A cultivator-shovel 24 and a moldboard 25 are fastened to each section 23, which during the second and third workings carries an additional cultivator-shovel 26. A yoke-piece 27, which has its ends pivotally connected to the rear of the cultivator-beams at 28, extends in an upward direction as high as the arch of the axle 16, where it is connected to one arm, 29, of a hand-lever 30, provided with the usual latching device found in machines of this class. The cultivator-beams project forward of the arched axle 16 and are jointed each to one end of an inverted-U-shaped connection 31, which arches over the bar 18. The upright legs of said connection pass through guides fixed to the braces 21, which arrangement, in connection with the yoke-piece 27, holds the cultivator-beams in proper relation to each other and to the line of draft.

The cultivator hereinabove described is to be used primarily on growing corn planted with a lister-plow, which plows the ground and at the same time plants the seed-corn, the ground being left in ridges and furrows, as represented in dotted lines, Fig. 3, the corn being planted in the furrows. As is well known, the furrows are not always evenly spaced, the distances between them varying four or five inches or more very often. To enable the cultivating mechanisms to accommodate themselves to the unequal distances between rows of corn, their arched angles are made to move freely in an endwise direction, as hereinabove described, the mechanisms being guided and held in proper relation to the rows of corn by the shape of the supporting-wheels, which having beveled peripheries and running on the bottom of the ridges guide and retain the cultivating devices in their true position.

When cultivating corn the first time, the shovels and moldboards are in the position represented in Fig. 1, the shovels 26 not being attached. The moldboards 25 as the cultivator passes through a field loosen the earth on the ridges and throw it higher up, while the shovels 24 bring a little loose earth to the young corn-plants, which at this time are quite small. In going through corn the second time no change is made in the position of the moldboards and shovels 24; but the shovels 26 are attached to the ends of the beams outside the moldboards to kill the weeds in the center of the ridges. The moldboards again throw the earth outwardly; but the inner shovels 24 are set to throw a greater quantity of earth around the corn. At the third cultivation the moldboards are turned so as to throw earth around the base of the corn, while one or both shovels may be used to cultivate the ground between the rows.

From the above description it may be readily understood that the one machine is equipped to cultivate corn in fields where the rows are unequally spaced and the furrows run in irregular lines and that it can be used for working corn at all stages with but slight changes in position of the shovels.

Having thus described the invention, what is claimed is—

1. In a cultivator, a main frame having arched portions, roller-bearings on the main frame, an arched shaft adjustable laterally on said roller-bearings, guiding and supporting wheels upon said shaft, a bar connected at one end to the arched portion of the shaft, braces connecting the other end of the bar to the horizontal portions of the shaft, and antifriction-rollers carried by said bar to travel upon the arched portions of the frame.

2. In a cultivator, a main frame provided with arched portions, the front arched portion having a trackway attached thereto, bearing-rollers upon the frame, an arched axle adjustable laterally on said bearing-roller, supporting and guiding wheels upon said axle, a bar connected at its rear end to the arched portion of the axle and provided with rollers to travel upon the arched portions of the frame and also with rollers engaging said trackway, and braces between the forward portion of the bar and horizontal portions of the axle.

3. In a cultivator, the combination of a main frame having arched portions, roller-bearings on the frame, an arched shaft movable laterally on said roller-bearings, supporting and guiding wheels on said shaft, a bar connected at one end to the arched portion of the axle and provided with roller-bearings to travel upon the frame, braces connecting the other end of the bar to the horizontal portions of the axle, beams pivotally mounted upon the horizontal portions of the axle, a yoke connected with the rear ends of the beams, an adjusting element mounted upon the arched portion of the shaft and connected with the yoke to adjust the beams in a vertical plane, and an inverted-U-shaped guiding member movable upon the aforementioned braces connecting the forward ends of the beams to move in unison, substantially as described.

In testimony whereof I affix my signature in presence of two witnesses.

HENRY FUNKNER.

Witnesses:
JOHN P. JANSEN,
K. W. JANSEN.